United States Patent
Oh et al.

(10) Patent No.: US 8,242,902 B2
(45) Date of Patent: Aug. 14, 2012

(54) URGENT MESSAGE TRANSMISSION SYSTEM AND METHOD

(75) Inventors: Sang-Kyung Oh, Seoul (KR); Ki-Tae Jang, Seongnam-si (KR); Hyuk-Min Kwon, Seoul (KR); Dong-Hoon Kim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 690 days.

(21) Appl. No.: 11/988,117

(22) PCT Filed: Oct. 19, 2005

(86) PCT No.: PCT/KR2005/003489
§ 371 (c)(1),
(2), (4) Date: Jul. 24, 2009

(87) PCT Pub. No.: WO2007/004769
PCT Pub. Date: Jan. 11, 2007

(65) Prior Publication Data
US 2009/0295565 A1    Dec. 3, 2009

(30) Foreign Application Priority Data

Jul. 1, 2005    (KR) .................. 10-2005-0059127

(51) Int. Cl.
*G08B 1/08*    (2006.01)
(52) U.S. Cl. .................. 340/539.11; 340/506; 340/3.1; 340/539.1; 340/539.13
(58) Field of Classification Search .................. 340/506, 340/3.1, 539.1, 539.11, 539.13
See application file for complete search history.

(56) References Cited

U.S. PATENT DOCUMENTS

| | | | |
|---|---|---|---|
| 6,212,260 B1 | 4/2001 | Baum et al. | |
| 6,510,207 B1 | 1/2003 | Cannon et al. | |
| 6,608,559 B1 * | 8/2003 | Lemelson et al. | ....... 340/539.13 |
| 6,694,132 B1 | 2/2004 | Lausi | |
| 7,502,621 B2 | 3/2009 | Lee | |
| 2003/0069002 A1 | 4/2003 | Hunter et al. | |
| 2003/0143974 A1 | 7/2003 | Navarro | |
| 2004/0203562 A1 | 10/2004 | Kolsrud | |
| 2004/0259568 A1 | 12/2004 | Patel | |

FOREIGN PATENT DOCUMENTS

| | | |
|---|---|---|
| EP | 1 209 886 A2 | 5/2002 |
| EP | 1 511 279 A2 | 3/2005 |
| JP | 11-355203 A | 12/1999 |
| JP | 2001-036645 | 2/2001 |

(Continued)

OTHER PUBLICATIONS

Supplementary European Search Report dated Nov. 10, 2010 in connection with European Patent Application No. EP 05 80 4554.

(Continued)

*Primary Examiner* — Daryl Pope (57) ABSTRACT

Disclosed is an urgent message transmission system. In the system, when a disaster warning message is received from a network provider, an originating terminal transmits the received disaster warning message to a preset urgent message recipient according to a user's request. Further, a terminating terminal having received an urgent message from the originating terminal transmits the received urgent message to a preset urgent message recipient according to a user's request. Accordingly, when an urgent message is received from a provider or a specific user, it is possible to quickly transfer the contents of the received urgent message to other users without recreating a separate urgent message.

37 Claims, 5 Drawing Sheets

FOREIGN PATENT DOCUMENTS

| | | |
|---|---|---|
| JP | 2001-148734 | 5/2001 |
| JP | 2002-073474 | 3/2002 |
| JP | 2002-078005 | 3/2002 |
| JP | 2003-067876 | 3/2003 |
| JP | 2003-244068 | 8/2003 |
| JP | 2005-062989 | 3/2005 |
| KR | 1020010110495 A | 12/2001 |
| KR | 2003-0045245 A | 6/2003 |
| KR | 2004-0009190 A | 1/2004 |
| KR | 2004-0024327 A | 3/2004 |
| KR | 1020040046258 A | 6/2004 |
| KR | 102004010011 | 12/2004 |
| KR | 1020050079355 A | 8/2005 |

OTHER PUBLICATIONS

Japanese Office Action dated Nov. 9, 2010 in connection with Japanese Patent Application No. 2008-519156.

\* cited by examiner

URGENT MESSAGE TRANSMISSION SYSTEM AND METHOD

CROSS-REFERENCE TO RELATED APPLICATION(S)

The present application is related to International Application No. PCT/KR2005/003489 filed Oct. 19, 2005 entitled "URGENT MESSAGE TRANSMISSION SYSTEM AND METHOD" which claims priority to Korean Patent Application No. 10-2005-0059127 filed Jul. 1, 2005. International Application No. PCT/KR2005/003489 is assigned to the assignee of the present application and is hereby incorporated by reference into the present disclosure as if fully set forth herein. The present application hereby claims priority under 35 U.S.C. §119(a) to International Patent Application No. PCT/KR2005/003489 and Korean Patent Application No. 10-2005-0059127.

BACKGROUND OF THE INVENTION

1. Field of the Invention

The present invention relates to an urgent message transmission system and method, and more particularly to an urgent message transmission system and method, which can quickly inform users of an urgent situation such as disaster by using a mobile communication terminal.

2. Description of the Related Art

When there occurs a natural disaster such as an earthquake, a tidal wave, a typhoon and a downpour, or an accident such as a fire and a traffic accident, it is necessary to warn people of the accident in order to shelter or pay attention to it. Further, people facing urgent situations due to the disaster or accident must seek for help.

With the development of communication technology, persons come to always carry individual mobile communication terminals with them. Accordingly, it is possible to easily warn them of a disaster and for persons under urgent situations due to the disaster to quickly seek for help through the mobile communication terminal.

Recently, an urgent message service has been provided, which can report urgent situations such as disasters by means of a mobile communication terminal.

A conventional urgent message service using a mobile communication terminal includes a service, in which a network provider integrally transmits urgent messages reporting an accident, etc., to terminal users, and a service in which a user transmits an urgent message to a predetermined recipient.

First, when the network provider transmits the urgent message, the network provider integrally transmits a short message including a weather forecast warning of a typhoon/a downpour to terminals, transmits a disaster warning to terminals through a DMB, or transmits disaster-related messages to terminals within a disaster area.

Further, when the user transmits the urgent message, the user performs an urgent message transmission key input having been set in a terminal in advance, and transmits the already stored urgent message to a preset recipient.

When the provider integrally transmits the urgent messages to users as described above, each user can solely check the urgent message received from the provider, and it takes a long time and it is complex to transfer the urgent message to other users. Accordingly, it is difficult to transfer the urgent message to other persons during urgent situations.

Further, even when the user transmits the urgent message to the predetermined recipient, the use can transmit only the already stored urgent message. Accordingly, in order to transfer an urgent message, which has been received from a specific user, to another user, the urgent message must be newly set. Therefore, the user is inconvenienced.

SUMMARY OF THE INVENTION

Accordingly, the present invention has been made to solve the above-mentioned problems occurring in the prior art, and it is an object of the present invention to provide an urgent message transmission system and method, which can transfer the contents of an urgent message to other users without recreating a separate urgent message when the urgent message is received from a provider or a specific user.

It is another object of the present invention to provide an urgent message transmission system and method, which can transfer an urgent message to other users by a simple key operation of a user when the urgent message is received from a provider or a specific user.

It is further another object of the present invention to provide an urgent message transmission system and method, which can transfer an urgent message or an already stored urgent message to other users according to whether a predetermined time period has passed after the urgent message is received from a provider or a specific user.

In order to accomplish the aforementioned object, according to one aspect of the present, there is provided an urgent message transmission system including: a network provider for receiving disaster information and broadcasting a disaster warning message; and a terminal for receiving the disaster warning message from the network provider and transmitting the received disaster warning message to a preset urgent message recipient.

In order to accomplish the aforementioned object, according to another aspect of the present, there is provided an urgent message transmission system including: an originating terminal for transmitting an urgent message to a preset urgent message recipient according to a user's urgent message transmission request; and a terminating terminal for receiving the urgent message from the originating terminal and transmitting the received urgent message to a preset urgent message recipient In order to accomplish the aforementioned object, according to further another aspect of the present, there is provided a mobile communication terminal for transmitting an urgent message, the terminal including: a radio unit for transmitting/receiving a predetermined message; a memory for storing contents of an already registered urgent message and an urgent message recipient; a key input unit having an urgent message transmission key; and a controller for transmitting a disaster warning message to the urgent message recipient when urgent message transmission key input is received after the disaster warning message is received from a network provider.

In order to accomplish the aforementioned object, according to still another aspect of the present, there is provided an urgent message transmission method including the steps of: receiving disaster information and broadcasting a disaster warning message by a network provider; and receiving by a terminal the disaster warning message and transmitting the received disaster warning message to a preset urgent message recipient.

In order to accomplish the aforementioned object, according to yet another aspect of the present, there is provided an urgent message transmission method including the steps of: transmitting by an originating terminal an urgent message to an urgent message recipient stored in the originating terminal in advance; and receiving by a terminating terminal the urgent message from the originating terminal and transmitting the received urgent message to an urgent message recipient stored in the terminating terminal in advance.

BRIEF DESCRIPTION OF THE DRAWINGS

The above and other objects, features and advantages of the present invention will be more apparent from the following detailed description taken in FIG. 1 is a block diagram illustrating the construction of an urgent message transmission system according to an embodiment of the present invention.

DETAILED DESCRIPTION OF THE PREFERRED EMBODIMENT

Hereinafter, preferred embodiments according to the present invention will be described with reference to the accompanying drawings. In the following description of the present invention, a detailed description of known functions and configurations incorporated herein will be omitted when it may make the subject matter of the present invention rather unclear.

Figure 1:
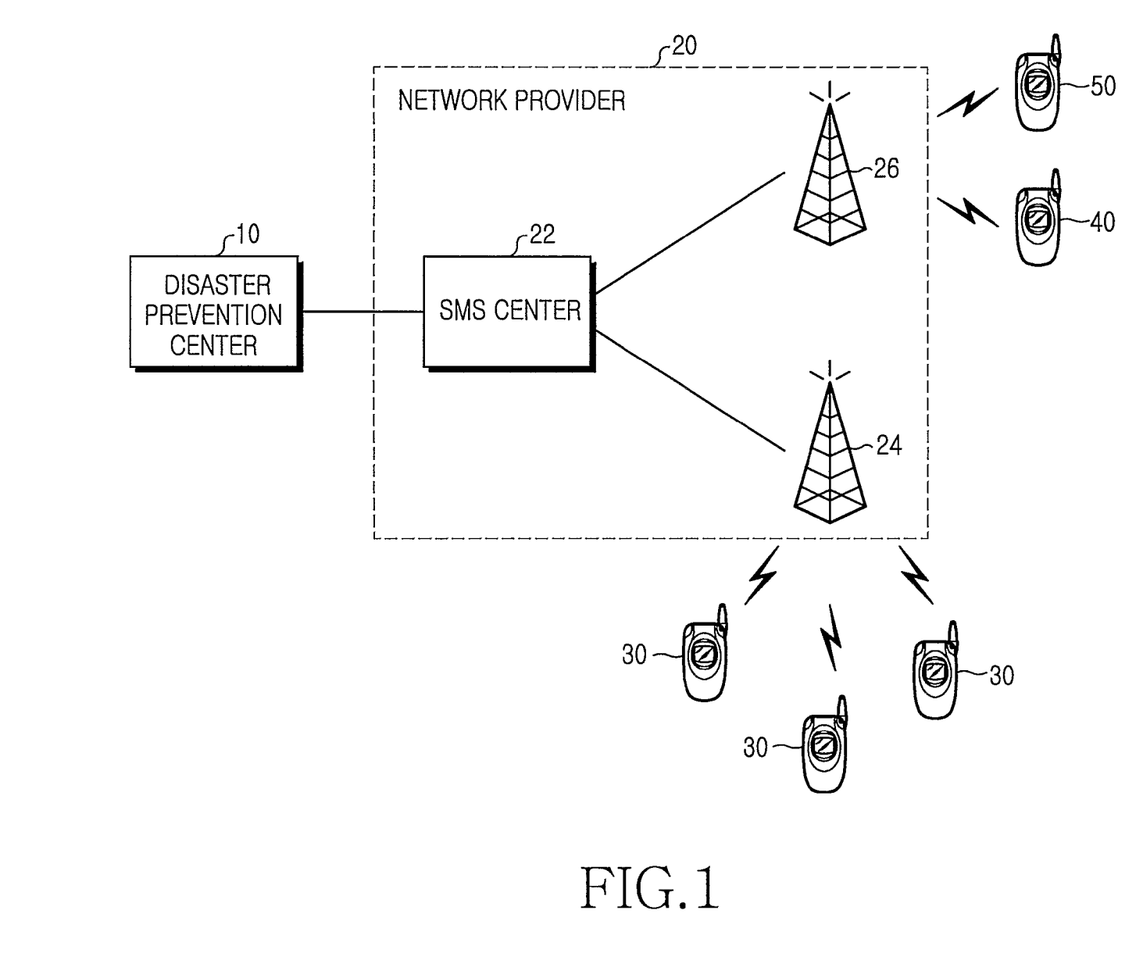

FIG. 1 is a block diagram illustrating the construction of an urgent message transmission system according to an embodiment of the present invention. Referring to FIG. 1, the urgent message transmission system includes a disaster prevention center 10, a network provider 20, an originating terminal 30 and a terminating terminal 40.

The disaster prevention center 10 may be a police station, a meteorological agency, a fire station, etc. Further, the disaster prevention center 10 receives reports of a natural disaster such as an earthquake, a tidal wave, a typhoon and a downpour, or an accident such as a fire and a traffic accident, and provides disaster information based on the received reports to the network provider 20.

The network provider 20 receives the disaster information from the disaster prevention center 10 and broadcasts a disaster warning message to a corresponding cell. This network provider 20 may include a Short Message Service (SMS) center 22 and base stations 24 and 26.

When the disaster information is received from the disaster prevention center 10, the SMS center 22 generates the disaster warning message including a disaster information dedicated identification (ID) and disaster information contents in the form of an SMS message, and provides the generated disaster warning message to the base station 24 in a corresponding area. The base station 24 broadcasts the disaster warning SMS message.

Herein, the network provider 20 may be a mobile communication provider employing a Global System for Mobile communication (GSM) scheme or a Code Division Multiple Access (CDMA) scheme. When the network provider 20 is the mobile communication provider 20 employing a GSM scheme, a protocol ID, a MSG class ID, etc., may be used as the disaster information dedicated ID. When the network provider 20 is the mobile communication provider 20 employing a CDMA scheme, a teleservice ID may be used as the disaster information dedicated ID.

The originating terminal 30 is a mobile communication terminal located in a cell area within which the disaster warning message is broadcasted, which receives the disaster warning message broadcasted from the corresponding base station 24. When the disaster warning message is received, the originating terminal 30 outputs a warning alarm or voice and outputs the received disaster warning message to a display unit. Further, when urgent message transmission key is inputted by a user after the disaster warning message is received, the originating terminal 30 transmits an urgent message, which includes both the contents of the received disaster warning message or another urgent message including an already stored urgent message and a super password in the first portion thereof, to the predetermined terminating terminal 40.

The terminating terminal 40 is a terminal corresponding to an urgent message recipient having been set in the originating terminal 30 in advance. When a message is received, the terminating terminal 40 determines if the received message is an urgent message according to whether the received message includes the super password. As a result of the determination, when the received message is the urgent message, the terminating terminal 40 outputs the contents of the urgent message to a display unit, and outputs an alarm or voice reporting reception of the urgent message. Further, when urgent message transmission key input is received from a user after the urgent message is received, the terminating terminal 40 can transmit an urgent message, which includes both the contents of the received urgent message or an already stored urgent message and a super password in the first portion of the urgent message, to another predetermined terminating terminal 50.

Hereinafter, an urgent message transmission method in the urgent message transmission system according to the embodiment of the present invention as described above will be described.

Figure 2:
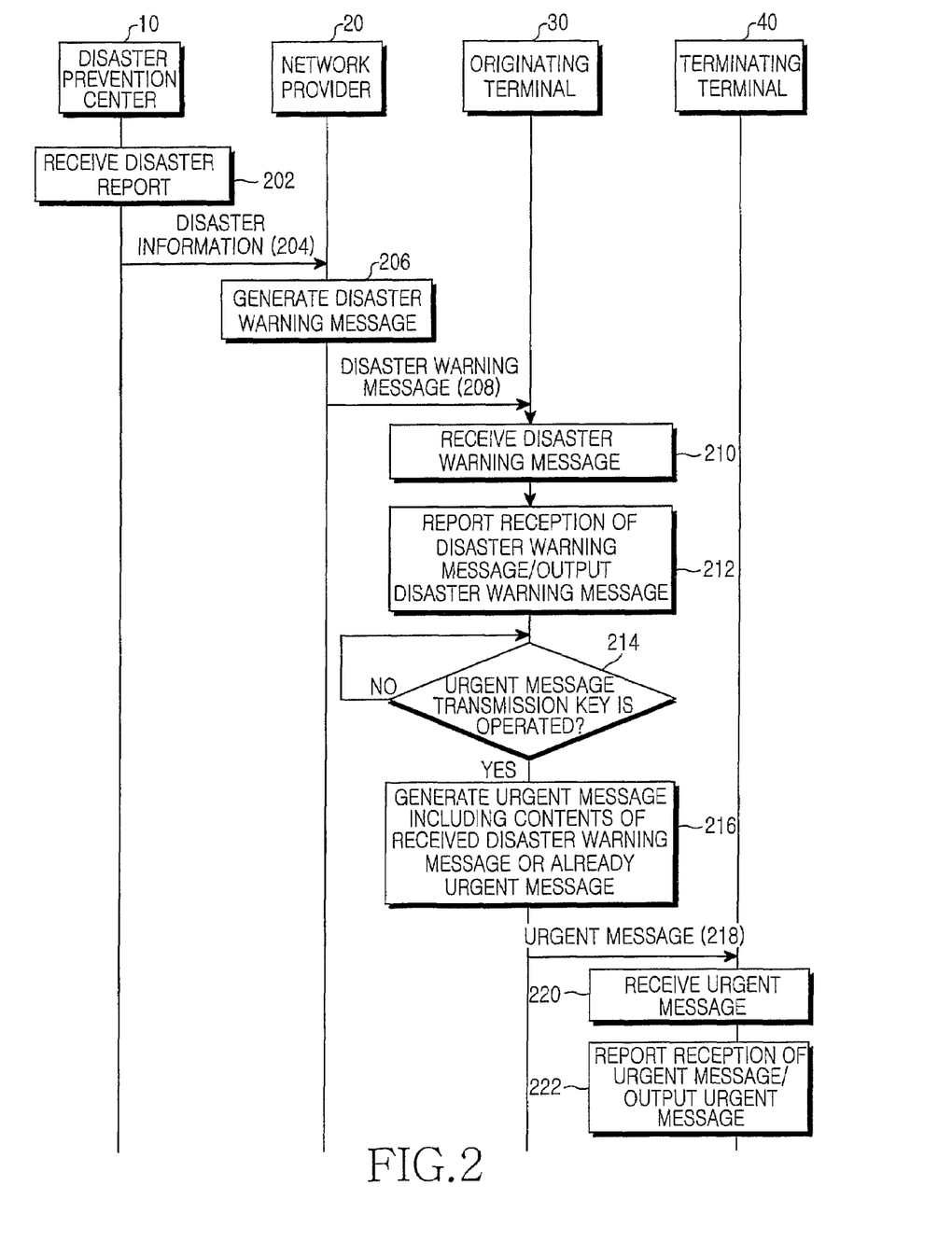
FIG. 2 is a flow diagram illustrating an urgent message transmission method according to an embodiment of the present invention.

FIG. 2 is a flow diagram illustrating the urgent message transmission method according to the embodiment of the present invention. Referring to FIG. 2, in step 202, the disaster prevention center 10 receives disaster reports of a natural disaster such as an earthquake, a tidal wave, a typhoon and a downpour, or an accident such as a fire and a traffic accident.

When the disaster report is received, the disaster prevention center 10 provides disaster information to the network provider 20 in step 204. The disaster information includes information regarding where a disaster has occurred, which disaster has occurred, how to avoid the disaster and so forth.

When the disaster information is provided from the disaster prevention center 10, the network provider 20 generates a disaster warning message based on the received disaster information in step 206. That is, the network provider 20 generates an SMS message or a Multimedia Message Service (MMS) message including contents of the disaster information provided from the disaster prevention center 10 and a disaster information dedicated ID.

The network provider 20 broadcasts the disaster warning message through the corresponding base station 24 in step 208.

The originating terminal 30 located in a corresponding cell area receives the disaster warning message broadcasted from the base station 24 in step 210.

When the disaster warning message is received, the originating terminal 30 outputs a warning alarm or voice and outputs the received disaster warning message to a display unit, in step 212.

Herein, the originating terminal 30 may output the alarm or voice and the disaster warning message every predetermined time period and by a predetermined number of times, e.g., twice notification every ten seconds. Further, the originating terminal 30 may output the disaster warning message and simultaneously trigger a vibration or turn on a lamp and the backlight of a Liquid Crystal Display (LCD) and a keypad.

After receiving the disaster warning message, the originating terminal 30 determines if an urgent message transmission key is operated by a user, in step 214.

If urgent message transmission key is inputted by the user, the originating terminal 30 generates an urgent message including the contents of the received disaster warning message or an already stored urgent message in step 216. Herein, if a predetermined time period has not passed after reception of the disaster warning message, the originating terminal 30 generates the urgent message including the contents of the received disaster warning message. However, if the predetermined time period has passed after reception of the disaster warning message, the originating terminal 30 generates the urgent message including the contents of the already stored urgent message.

The urgent message transmission key input may be performed by inputting a preset key (e.g., a cancel key, a volume key, etc) by a predetermined number of times (e.g., four times). Further, when generating the urgent message, the originating terminal 30 inserts a super password into the first portion of the urgent message in order to represent that the message is a predetermined urgent message.

After generating the urgent message, the originating terminal 30 transmits the generated urgent message to the terminating terminal 40 which is a preset urgent message recipient, in step 218.

The terminating terminal 40 receives the urgent message in step 220. When the urgent message is received, the terminating terminal 40 determines if the received message is an urgent message according to whether the received message includes the super password.

When the urgent message has been received, the terminating terminal 40 outputs a warning alarm or voice and simultaneously outputs the urgent message to a display unit, in step 222.

Further, when an urgent message transmission key input is received from a user after reception of the urgent message, the terminating terminal 40 can transmit an urgent message, which includes contents of the received urgent message or another urgent message including an already stored urgent message and a super password in the first portion thereof, to another predetermined terminating terminal 50.

According to the urgent message transmission system and method according to the embodiment of the present invention as described above, it is possible to instantly transfer the received disaster warning message or the urgent message to other users through a simple key operation.

Hereinafter, the construction and operation of a mobile communication terminal corresponding to the originating terminal 30 or the terminating terminal 40 in the urgent message transmission system according to the embodiment of the present invention will be described in detail. The mobile communication terminal may operate as the originating terminal 30 or the terminating terminal 40 as the situation requires.

Figure 3:
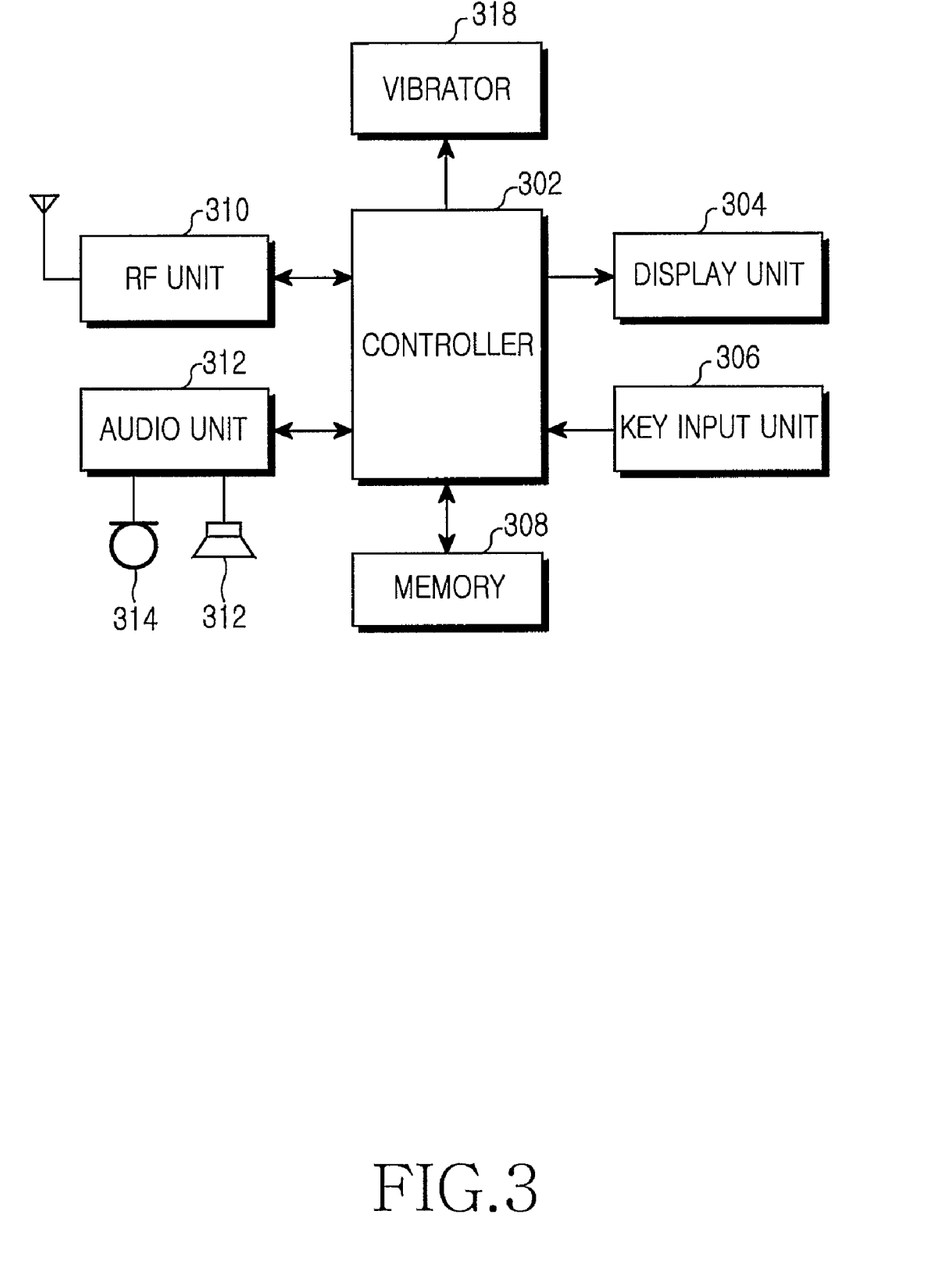
FIG. 3 is a block diagram of a mobile communication terminal according to an embodiment of the present invention.

FIG. 3 is a block diagram of the mobile communication terminal according to the embodiment of the present invention. Referring to FIG. 3, the mobile communication terminal includes a controller 302, a display unit 304, a key input unit 306, a memory 308, a radio unit 310, an audio unit 312, a speaker 314, a microphone (MIC) 316, and a vibrator 318.

The controller 302 performs a general control operation for transmission of an urgent message according to the embodiment of the present invention. When a message is received, this controller 302 reads passwords and IDs within the received message and determines if the received message is an urgent message. At this time, the message can be received from the network provider or the specific user. Further, when the urgent message is received from the network provider or the specific user, the controller 302 outputs a warning alarm or voice and controls the urgent message to be output.

If urgent message transmission key input is received from a user after reception of the urgent message, the controller 302 generates an urgent message including the contents of the received urgent message or an already stored urgent message according to whether a predetermined time period has passed after the reception of the urgent message, and transmits the generated urgent message to a predetermined recipient. In generating the urgent message, the controller 302 inserts a password, e.g., a super password, into the first portion of the urgent message in order to represent that the generated message is a predetermined urgent message.

The display unit 304 may include a LCD, etc., and output various display data generated in the mobile communication terminal. This display unit 304 displays the received urgent message according to a display-control signal output from the controller 302, and displays a text representing the transmission state of the urgent message when the urgent message is transmitted. Further, the display unit 304 turns on a backlight when the urgent message is output.

The memory 308 may include a Read Only Memory (ROM) and a Read Access Memory (RAM) for storing a plurality of programs and data, and stores programs and data for performing transmission of the urgent message according to the embodiment of the present invention. This memory 308 stores in advance urgent message contents and at least one urgent message recipient to which the urgent message is to be transmitted according to the embodiment of the present invention. Herein, already stored contents or contents edited by a user may also be used as the urgent message contents and the urgent message recipient.

The radio unit 310 receives data corresponding to the urgent message to be transmitted by the controller 302, performs a digital radio modulation for the data to send the processed data through an antenna, and demodulates signals received through the antenna to transfer the demodulated signals to the controller 302. This radio unit 310 transmits the urgent message to an urgent message recipient registered in advance under the control of the controller 302, or receives an urgent message from a provider or another user to transfer the received urgent message to the controller 302.

The audio unit 312 converts voice data to audio signals, which a user can hear through the speaker 314, under the control of the controller 302, and outputs the audio signals. Further, the audio unit 312 converts audio signals received from the microphone 316 into data and outputs the data to the controller 302. In addition, when a disaster warning message is received from a provider or an urgent message is received from another user, this audio unit 312 outputs an alarm or voice signals for reporting the reception of the disaster warning message or the urgent message under the control of the controller 302.

When the urgent message is received, the vibrator 318 triggers a vibration in order to report the reception of the urgent message under the control of the controller 302.

The key input unit 306 is a device for an interface with a user, which includes various function keys (e.g., camera control keys, speaker volume control keys), a plurality of keys for communication, text input, etc., and an urgent message transmission key. In the key input unit 306, the urgent message transmission key may be a separate button, and a button assigned for another function can be newly defined in order to be used as a button for transmission of the urgent message. For example, inputting a specific key such as a volume key by a predetermined number of times (e.g. four times) can be defined as urgent message transmission key input for use. Accordingly, when the urgent message transmission key input is received from a user, the key input unit 306 outputs urgent message transmission key input signals to the controller 302.

Figure 4:
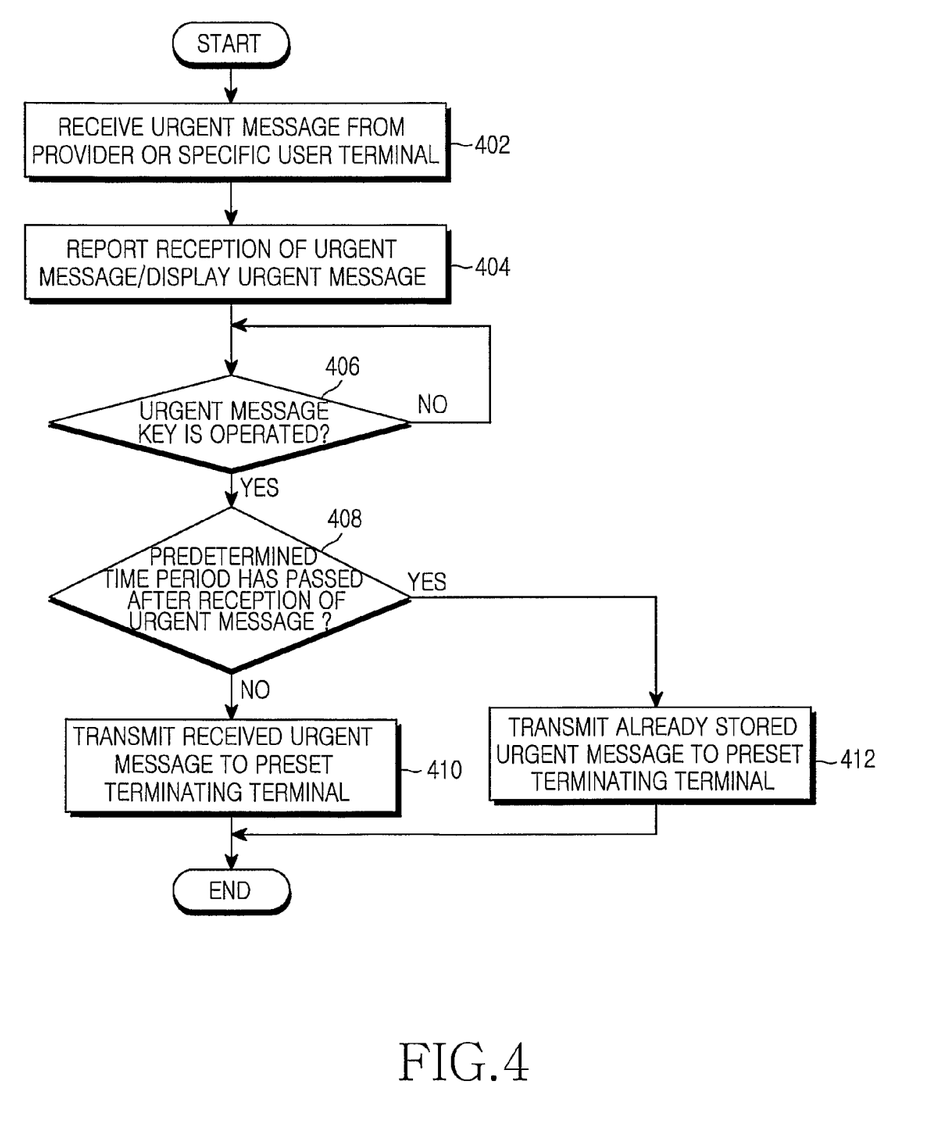
FIG. 4 is a flow diagram illustrating an urgent message sending process by a mobile communication terminal according to an embodiment of the present invention.

Hereinafter, an operation by which the mobile communication terminal sends an urgent message according to the embodiment of the present invention will be described. FIG. 4 is a flow diagram illustrating an urgent message sending process by the mobile communication terminal according to the embodiment of the present invention.

Referring to FIG. 4, in step 402, the mobile communication terminal receives an urgent message from a provider or a specific user terminal. Herein, the mobile communication terminal may receive a disaster warning message for reporting a disaster from the network provider or an urgent message such as a rescue request message from the specific user terminal.

When the urgent message is received, the mobile communication terminal reports the reception of the urgent message and displays the urgent message in step 404.

And the mobile communication terminal determines if urgent message transmission key input is received from a user in step 406.

If the urgent message transmission key is inputted by the user after reception of the urgent message, the mobile communication terminal determines if a predetermined time period has passed after the reception of the urgent message in step 408. The reason for determining if the predetermined time period has passed after the reception of the urgent message is because the urgent message may be invalid when it is a long time since the urgent message was received.

As a result of the determination, if the predetermined time period has not passed after the reception of the urgent message, it is highly probable that the urgent message is valid. Accordingly, in step 410, the mobile communication terminal transmits a new urgent message, which includes both the contents of the received urgent message and a password (e.g., super password) for reporting that a transmitted message is an urgent message, to a predetermined terminating terminal.

However, if the predetermined time period has passed after the reception of the urgent message, it is highly probable that the urgent message is invalid. Accordingly, in step 412, the mobile communication terminal transmits a new urgent message, which includes both the contents of an already stored urgent message and a password (e.g., super password) for reporting that a transmitted message is an urgent message, to a predetermined terminating terminal.

After transmitting the new urgent message, the mobile communication terminal may display a message "Sending Urgent Message" for reporting the sending of the urgent message. The super password included in the urgent message is a 4 digit password code based on date/time, and prevents the urgent message from being abused for functions other than for reporting an urgent situation.

Further, when an incoming call is received after transmission of the urgent message, the mobile communication terminal determines if the incoming call is an incoming call from an urgent message recipient. When the received incoming call is the incoming call from the urgent message recipient, the mobile communication terminal allows the incoming call to be automatically connected to the urgent message recipient without a reception notification. However, when the received incoming call is an incoming call from a different originator other than the urgent message recipient, the mobile communication terminal transmits an automatic response message for reporting an urgent situation to the originator without a reception notification. The automatic response message for reporting the urgent situation may be a message for requesting a report to the disaster prevention center 10 such as a police station and a fire station because a user is affected by the urgent situation.

When the incoming call from the urgent message recipient is connected, the mobile communication terminal in which a folder is closed can control audio signal input to the microphone to be normally performed even though audio signal output through the speaker is stopped. This is for transferring audio signals corresponding to the current urgent situation of the user to the urgent message recipient even though audio signals transferred from the urgent message recipient cannot be reported to the user, when the call connection to the urgent message recipient has been performed.

In the meantime, when the incoming call from the urgent message recipient is connected, the mobile communication terminal in which a folder is open can control the audio signal output through the speaker to be performed at a minimum volume level, and control the audio signal input to the microphone to be normally performed. This is for transferring the audio signals corresponding to the current urgent situation to the urgent message recipient while preventing the audio signals transferred from the urgent message recipient from being heard by an injurer such as a robber or a thief near the user, when the call connection to the urgent message recipient has been performed.

Figure 5:
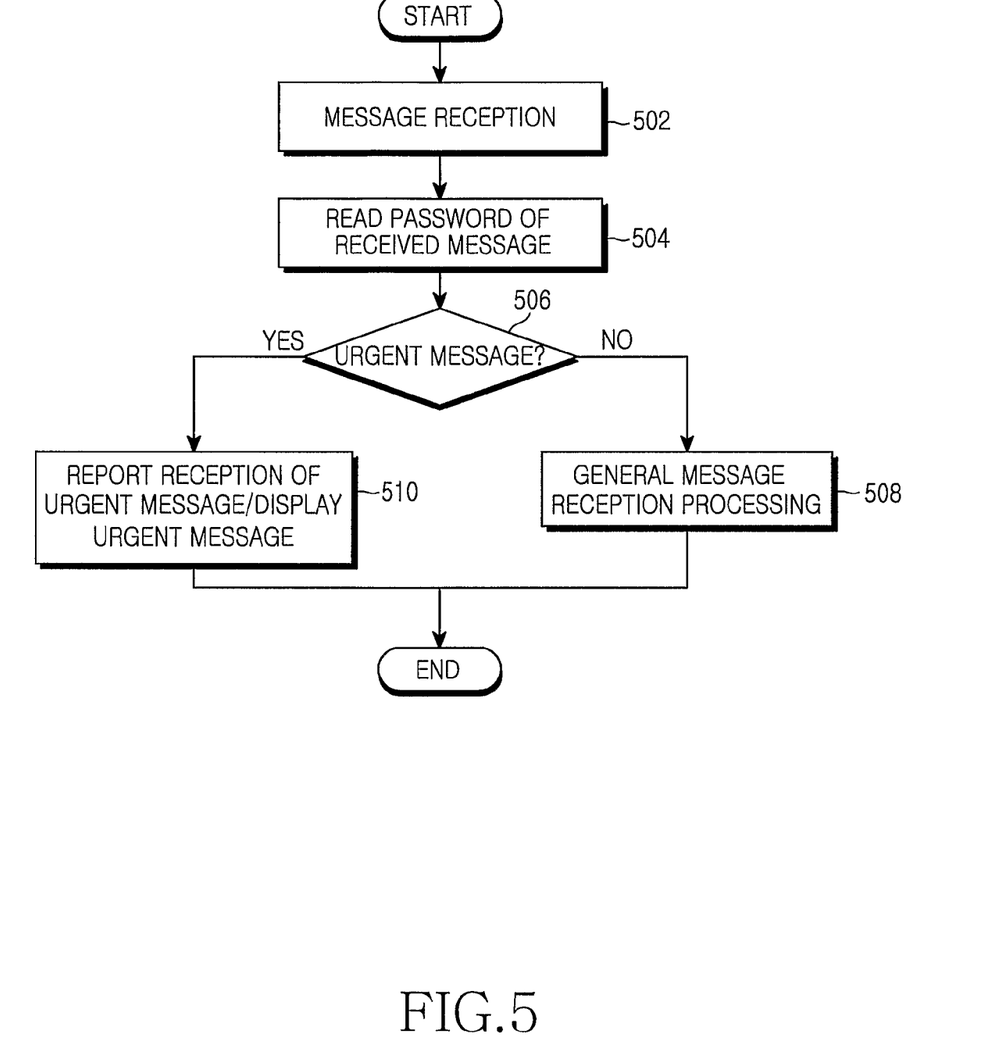
FIG. 5 is a flow diagram illustrating an urgent message reception process by a mobile communication terminal according to an embodiment of the present invention.

Hereinafter, an operation by which the mobile communication terminal receives an urgent message according to the embodiment of the present invention will be described. FIG. 5 is a flow diagram illustrating an urgent message reception process by the mobile communication terminal according to the embodiment of the present invention.

Referring to FIG. 5, in step 502, the mobile communication terminal receives a message through the radio unit 310. In step 504, the mobile communication terminal reads the password in the received message.

As a result of reading the password, the mobile communication terminal determines if the received message is an urgent message in step 506. Herein, if the received message includes a password (e.g., a super password) representing the urgent message, the mobile communication terminal determines the received message as the urgent message. However, if the received message does not include the password representing the urgent message, the mobile communication terminal determines the received message as a general message.

If the received message is not an urgent message, the mobile communication terminal performs a general message reception processing in step 508.

However, if the received message is the urgent message, the mobile communication terminal outputs an alarm or voice for reporting the reception of the urgent message and displays the contents of the urgent message through the display unit 304 in step 510.

The alarm or voice for reporting the reception of the urgent message may be output at maximum volume regardless of the preset ring volume for a general message.

Further, the urgent message reception alarm or voice may be output as a newly set urgent message alarm sound such as a siren or an already stored urgent message voice "urgent situation" regardless of the preset ring-type for a general message. When a user designates a message notification interval as no notification/once, the urgent message alarm or voice may be output at maximum volume only once. When the user designates the message notification interval as notification every two minutes, the ringing sound for reporting the reception of the urgent message is output at maximum volume every two minutes. In the meantime, in a case where the terminal is in communication when the urgent message is received, the urgent message reception alarm or voice is output at low volume. Further, in a case where the terminal is in a browser operation, modem communication or an additional service operation when the urgent message is received, the terminal may output the urgent message reception alarm or voice and simultaneously display an urgent message reception icon for reporting the reception of the urgent message. Moreover, the terminal may output the urgent message and simultaneously trigger a vibration. In addition, the terminal may also turn on a lamp and the backlight of the display unit 304 and the key input unit 306.

According to the present invention as described above, when an urgent message is received from a provider or a specific user, it is possible to quickly transfer the contents of the received urgent message to other users without recreating a separate urgent message. Further, according to the present invention, it is possible to quickly transfer an urgent message received from a provider or a specific user to other users by a simple key operation.

While the present invention has been shown and described with reference to certain preferred embodiments thereof, it will be understood by those skilled in the art that various changes in form and details may be made therein without departing from the spirit and scope of the invention as defined by the appended claims.

What is claimed is:

1. An urgent message transmission system comprising:
a network provider configured to receive disaster information and broadcast a disaster warning message to corresponding area; and
a terminal configured to receive the disaster warning message from the network provider and transmit the received disaster warning message to a preset-urgent message recipient,
wherein, when a predetermined urgent message transmission key input is received, the terminal is further configured to transmit the received disaster warning message to the preset-urgent message recipient if a predetermined time period has not passed after reception of the disaster warning message.

2. The system as claimed in claim 1, wherein the terminal is further configured to transmit the received disaster warning message to the urgent message recipient according to the predetermined urgent message transmission key input.

3. The system as claimed in claim 1, further comprising:
a disaster prevention center configured to receive a disaster report and provide the network provider with the disaster information.

4. The system as claimed in claim 1, wherein the network provider comprises:
a Short Message Service (SMS) center configured to generate the disaster warning message including a disaster information dedicated identification (ID) and disaster information contents; and
a base station configured to broadcast the disaster warning message generated by the SMS center to a corresponding area.

5. The system as claimed in claim 4, wherein the disaster information dedicated ID includes one of a protocol ID and a MSG class ID when the network provider is a Global System for Mobile communication (GSM) mobile communication provider.

6. The system as claimed in claim 4, wherein the disaster information dedicated ID includes a teleservice ID when the network provider is a Code Division Multiple Access (CDMA) mobile communication provider.

7. The system as claimed in claim 1, wherein the network provider is further configured to generate and broadcast the disaster warning message in a form of an SMS message.

8. The system as claimed in claim 1, wherein the network provider is further configured to generate and broadcast the disaster warning message in a form of a Multimedia Message Service (MMS) message.

9. The system as claimed in claim 1, wherein, when predetermined urgent message transmission key input is received, the terminal is further configured to transmit an urgent message to the preset urgent message recipient, the urgent message including contents of the received disaster warning message and a super password.

10. The system as claimed in claim 1, wherein, when the disaster warning message is received, the terminal is further configured to output an alarm for reporting reception of the disaster warning message and the disaster warning message.

11. The system as claimed in claim 1, wherein, when the disaster warning message is received, the terminal is further configured to output the disaster warning message and simultaneously triggers a vibration, and turn on at least one of a lamp, a backlight of a Liquid Crystal Display (LCD), and a keypad.

12. The system as claimed in claim 1, wherein, when an urgent message is received from a specific user, the terminal is further configured to transmit the received urgent message to the urgent message recipient.

13. An urgent message transmission system comprising:
an originating terminal configured to transmit an urgent message to a preset urgent message recipient according to a user's urgent message transmission request; and
a terminating terminal configured to receive the urgent message from the originating terminal and transmit the received urgent message to a preset urgent message recipient,
wherein, when a predetermined urgent message transmission key input is received, the terminating terminal is further configured to transmit the received urgent message to the preset urgent message recipient if a predetermined time period has not passed after reception of the urgent message.

14. The system as claimed in claim 13, wherein, when the predetermined urgent message transmission key input is received after the urgent message is received from the originating terminal, the terminating terminal is further configured to transmit an urgent message to the urgent message recipient, the urgent message including contents of the received urgent message and a super password.

15. The system as claimed in claim 13, wherein, when the urgent message is received, the terminating terminal is further configured to generate alarms for reporting reception of the urgent message and output the urgent message.

16. The system as claimed in claim 13, wherein, when the urgent message is received, the terminating terminal is further configured to output the urgent message and simultaneously trigger a vibration, and turn on at least one of a lamp, a backlight of a Liquid Crystal Display (LCD), and a keypad.

17. A mobile communication terminal configured to transmit an urgent message, the terminal comprising:
   a radio unit configured to transmit and receive a predetermined message;
   a memory configured to store contents of an already registered urgent message and an urgent message recipient;
   a key input unit including an urgent message transmission key; and
   a controller configured to transmit a disaster warning message to the urgent message recipient when urgent message transmission key input is received after the disaster warning message is received from a network provider,
   wherein, when the urgent message transmission key input is received, the controller is further configured to transmit the disaster warning message to the urgent message recipient if a redetermined time period has not passed after reception of the disaster warning message.

18. The terminal as claimed in claim 17, wherein the urgent message transmission key input is performed by continuously inputting a specific key included in the key input unit several times.

19. The terminal as claimed in claim 17, wherein the specific key includes one of a volume key and a cancel key.

20. The terminal as claimed in claim 17, wherein, when the urgent message transmission key input is received after an urgent message is received a specific user, the controller is further configured to control the received urgent message to be transmitted to the urgent message recipient.

21. The terminal as claimed in claim 20, wherein, when the urgent message transmission key input is received, the controller is further configured to transmit the received urgent message to the urgent message recipient if a predetermined time period has passed after reception of the urgent message, and the controller is further configured to transmit an already stored urgent message to the urgent message recipient if the predetermined time period has not passed.

22. An urgent message transmission method comprising:
   receiving disaster information and broadcasting a disaster warning message by a network provider; and
   receiving, by a terminal, the disaster warning message and transmitting the received disaster warning message to a preset urgent message recipient,
   wherein transmitting the received disaster warning message to the preset urgent message recipient comprises:
      determining whether a predetermined time period has passed when an urgent message transmission key input is received after reception of the disaster warning message; and
      transmitting the received disaster warning message to the preset urgent message recipient if the predetermined time period has not passed.

23. The method as claimed in claim 22, wherein broadcasting the disaster warning message comprises:
   receiving disaster information by a network provider from a disaster prevention center;
   generating the disaster warning message including contents of the disaster information and a disaster information dedicated ID; and
   broadcasting the disaster warning message through a base station in a corresponding area.

24. The method as claimed in claim 23, wherein the disaster information dedicated ID includes one of a protocol ID and a MSG class ID when the network provider is a Global System for Mobile communication (GSM) mobile communication provider.

25. The method as claimed in claim 23, wherein the disaster information dedicated ID includes a teleservice ID when the network provider is a Code Division Multiple Access (CDMA) mobile communication provider.

26. The method as claimed in claim 22, wherein the network provider generates and broadcasts the disaster warning message in a form of an SMS message.

27. The method as claimed in claim 22, wherein the network provider generates and broadcasts the disaster warning message in a form of a Multimedia Message Service (MMS) message.

28. The method as claimed in claim 22, wherein the terminal transmits an urgent message to the urgent message recipient, the urgent message including contents of the received disaster warning message and a super password.

29. The method as claimed in claim 22, further comprising:
   outputting by the terminal an alarm for reporting reception of the disaster warning message and the disaster warning message.

30. The method as claimed in claim 22, wherein the terminal outputs the disaster warning message and simultaneously triggers a vibration, and turns on at least one of a lamp, a backlight of a Liquid Crystal Display (LCD), and a keypad when the disaster warning message is received.

31. The method as claimed in claim 22, further comprising:
   receiving by the terminal an urgent message from a specific user and transmitting the received urgent message to the urgent message recipient.

32. The method as claimed in claim 31, wherein transmitting the received urgent message to the urgent message recipient comprises:
   determining if a predetermined time period has not passed when urgent message transmission key input is received after reception of the urgent message; and
   transmitting the received urgent message to the urgent message recipient if the predetermined time period has passed, and transmitting an already stored urgent message to the urgent message recipient if the predetermined time period has not passed.

33. The method as claimed in claim 31, wherein the terminal transmits an urgent message to the urgent message recipient, the urgent message including contents of the received urgent message and a super password.

34. The method as claimed in claim 31, further comprising:
   when the urgent message is received, outputting by the terminal an alarm and voice for reporting reception of the urgent message and the disaster warning message every predetermined time intervals and by a predetermined number of times.

35. The method as claimed in claim 31, wherein the terminal outputs the disaster warning message and simultaneously triggers a vibration, and turns on a lamp and a backlight of a Liquid Crystal Display (LCD) and a keypad when the urgent message is received.

36. An urgent message transmission method comprising:
   transmitting, by an originating terminal, an urgent message to an urgent message recipient stored in the originating terminal in advance; and
   receiving, by a terminating terminal, the urgent message from the originating terminal and transmitting the received urgent message to an urgent message recipient stored in the terminating terminal in advance, wherein transmitting the received urgent message to the urgent message recipient stored in the terminating terminal in advance comprises:

determining, by the terminating terminal, whether a predetermined time period has passed when an urgent message transmission key input is received after reception of the urgent message; and transmitting the received urgent message to the urgent message recipient if the redetermined time period has not passed.

37. The method as claimed in claim 36, wherein the terminating terminal and the originating terminal transmit urgent messages to the preset urgent message recipient, each of the urgent messages including contents of the urgent message and a super password representing an urgent message.

* * * * *